United States Patent [19]

Monaco et al.

[11] 4,306,156

[45] Dec. 15, 1981

[54] HYBRID PROPULSION AND COMPUTER CONTROLLED SYSTEMS TRANSITION AND SELECTION

[75] Inventors: Joseph A. Monaco; Julius A. Nespica, both of Brooklyn; Gordon Silverman, New York, all of N.Y.

[73] Assignee: Alexander Mencher Corporation, New York, N.Y.

[21] Appl. No.: 128,857

[22] Filed: Mar. 10, 1980

[51] Int. Cl.³ .............................................. B60L 11/02
[52] U.S. Cl. ........................................ 290/17; 290/16; 180/65 A; 318/139
[58] Field of Search ............. 180/65 A, 65 R; 290/16, 290/17; 318/139; 307/64, 65

[56] References Cited

U.S. PATENT DOCUMENTS

| | | | |
|---|---|---|---|
| 3,792,327 | 2/1974 | Waldorf | 318/139 |
| 3,837,419 | 9/1974 | Nakamura | 318/139 |
| 4,131,829 | 12/1978 | Gocho | 318/139 |
| 4,187,436 | 2/1980 | Etienne | 180/65 R |
| 4,199,037 | 4/1980 | White | 318/139 |

Primary Examiner—J. D. Miller
Assistant Examiner—D. L. Rebsch
Attorney, Agent, or Firm—Alexander Mencher

[57] ABSTRACT

A primary power source in the form of a direct energy converter provides d.c. voltage to a d.c. to a.c. converter. This in turn provides energy to an a.c. motor. The motor with appropriate speed control drives a mechanical load. When the energy of the primary source is depleted, an auxiliary engine is automatically started. The engine drives a d.c. generator which now supplies energy to the d.c. to a.c. converter. In addition, the d.c. generator can recharge the primary source. The primary power source may also be charged by an external power source. A computer controls the elements or components of the system.

7 Claims, 5 Drawing Figures

HYBRID PROPULSION AND COMPUTER CONTROLLED SYSTEMS TRANSITION AND SELECTION

BACKGROUND OF INVENTION

The invention relates to hybrid propulsion drives or systems for stationary or vehicular loads wherein loads to be driven are powered by electrical energy. This energy can be derived from either direct energy converters such as storage batteries (chemical to electrical), fuel or solar cells, or from gasoline or similar engines. These systems have the advantage of generating little or no pollution when utilizing the direct energy conversion elements; and when used with vehicular loads, such systems will either reduce the amount of gasoline or fuel consumed by the vehicle, extend the range of travel of the vehicle, or both.

Heretofore, there have been numerous suggestions to improve electrically driven vehicles. Recently, electrical propulsion systems have been augmented by including an auxiliary internal combustion engine used both to drive the vehicle and recharge the batteries supplying the electrical energy. Among problems involves in these suggestions have been the presence of expensive, unwieldy and inefficient structures and components, of complexities and lack of economy in systemic operation and transitions, and of difficulties met by drivers in adapting to known hybrid type of driving performance.

Prior art already ascertained and as presently deemed relevant to the invention is as follows:

| U.S. 3,367,438 | Moore | 2/68 |
| U.S. 3,525,874 | Toy | 8/70 |
| U.S. 3,530,356 | Aronson | 9/70 |
| U.S. 3,543,873 | Toy | 12/70 |
| U.S. 3,650,345 | Yardney | 3/72 |
| U.S. 3,713,504 | Shimer et al. | 1/73 |
| U.S. 3,861,484 | Joslin | 1/75 |
| U.S. 3,861,485 | Busch | 1/75 |
| U.S. 3,904,883 | Horwinski | 9/75 |
| U.S. 3,917,017 | Deane | 11/75 |
| U.S. 3,994,354 | Haumaier | 11/76 |

The present invention accordingly is directed to novel improvements over prior hybrid propulsion drives with respect to combinations of components and of component modifications, processes of operation, systemic transitions, and user's driving manipulation and handling.

SUMMARY OF INVENTION

The invention relates to hybrid propulsion to propel a vehicular load or supply mechanical energy to a stationary load, and is primarily directed to improvements in combinations of components (both known or herein improved), said components including selective automatic, computer and manual controls.

The invention attains prior objectives in the art such as reduction of pollution, saving of fuel and increase in distance range of travel by more simplified, efficient and economical means and process. Additionally, and under the invention herein, modern improvements in efficiency, power, and weight reduction of available and developing electrical storage batteries and a.c. motors for electrical drive of automobiles may also be utilized to augment increase in top speed and saving of energy. Moreover, embodiment of the invention is easily and economically adaptable for installation in existing vehicles or for incorporation in newly manufactured vehicles.

It is among the principal objects of the invention to provide novel and improved means and process for driving mechanical loads using a combination of energy sources.

Another object of the invention is to provide novel and improved means and process to drive a vehicular load without significant amounts of pollution being generated while the load is energized from the primary source; to increase the distance range of travel of a vehicular load over propulsion drives employing a single electrical energy source; to increase top speed of the vehicle; and to make user's driving manipulation and handling simple and comparable to his or her conventional driving operations.

A further object of the invention is to provide novel and improved means and process for automatically sensing the depletion of the primary energy source and for initiating operation of the auxiliary or secondary energy source without interruption of the flow of energy to the mechanical load.

Another object of the invention is to provide novel and improved means and process whereby the auxiliary or secondary energy source is capable of replenishing the energy of the primary energy source while supplying energy to the load.

These objects and other incidental ends and advantages of the invention will appear hereinafter in the progress of the disclosure and as pointed out in the appended claims.

DRAWINGS OF PREFERRED EMBODIMENT OF INVENTION

In the accompanying drawings showing a preferred form of the invention:

FIG. 1 is a block diagram of the entire hybrid propulsion drive including the transitional systems and wherein the components of each of the systems are numerically designated and comprising a primary power source; a d.c. to a.c. converter; an a.c. motor; a transmission, speed control and speed control lever; a voltage and current sensing network; a signal multiplexer; an analog to digital converter; a control computer, manual controls, mode control networks; starting/stopping control network; an auxiliary power source; an electrical generator; an external power source; control switches and resistor element in combination.

DESCRIPTION OF PREFERRED EMBODIMENT OF INVENTION

FIG. 1

Figure 1:
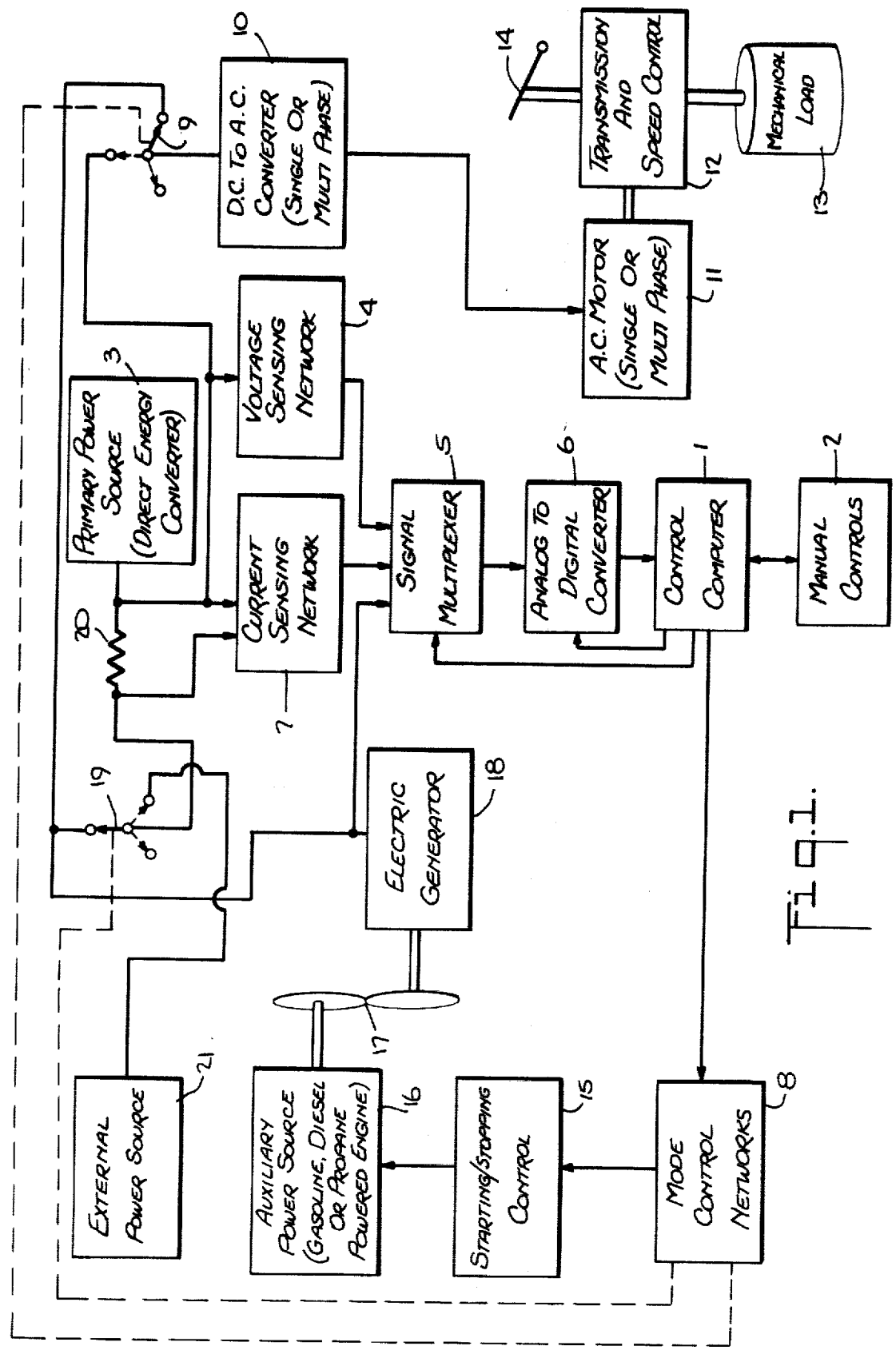

As seen in FIG. 1, the preferred embodiment of the invention includes as part thereof a control computer 1 and is comprised of a microcomputer which can be a type 8048 manufactured by the Intel Corpoation, 3065 Bowers Ave., Santa Clara, CA 95051. It includes the elements needed to sequence the operations shown in FIGS. 2A and 2B including a plurality of binary sequences stored therein. Manual controls 2 are provided so that a potential user might signify the desired operations. To start the system of hybrid propulsion, the user sends a signal from manual controls 2 to control computer 1. Control computer 1 senses the depletion of the primary power source 3. Primary power source 3 may be a multiplicity of batteries (chemical to electrical energy converter). a bank of solar cells, or similar direct energy converter. The detection of the depletion of the primary power source 3 is achieved using voltage sensing network 4 in combination with signal multiplexer 5, analog to digital converter 6 and control computer 1. Voltage sensing network 4 draws a small electrical current from primary power source 3. If the resultant drop in output voltage from primary power source 3 is less than a predetermined amount, then primary power source 3 is considered not to be depleted. The voltage output of voltage sensing network 4 is transmitted to signal multiplexer 5. Signal multiplexer 5 selects either the signal from voltage sensing network 4 or a current sensing network 7 drawing current from resistor 20. The signal to be transmitted from signal multiplexer 5 to analog to digital converter 6 is determined by control computer 1. A voltage signal (the one selected by the control computer 1) is transmitted from signal multiplexer 5 to analog to digital converter 6. The voltage signal is converted to a sequence of binary signals whose unique arrangement corresponds to the voltage present at its input. It is now (the binary output of analog to digital converter 6) a numerical equivalent of either the output of current sensing network 7 or voltage sensing network 4. This number is transmitted to control computer 1. This number will be compared against one of the binary sequences stored in control computer 1.

In normal operation primary power source 3 will not be depleted when the user starts the system. Control computer 1 will send a signal to mode control networks 8 that primary power source 3 is not depleted and mode control networks 8 will in turn cause switch 9 to a position in which the output of primary power source 3 is connected to the input of d.c. to a.c. converter 10. The d.c input to the d.c. to a.c. converter 10 is transformed from a d.c. to an alternating signal. This alternating signal appears at the output of d.c. to a.c. converter 10. This alternating signal is applied to a.c. motor 11. The a.c. motor 11 may be a single phase a.c. motor or it may be of a multiphase type. If it is a single phase motor than d.c. to a.c. converter 10 will be a single phase converter. Its output will appear as a single alternating signal. If a.c. motor is a multiphase motor then d.c. to a.c. converter 10 will be a multiphase converter. Its output will consist of a multiplicity of alternating signals whose phase relationships are such as to satisfy the requirements of a.c. motor 11. When a.c. motor 11 is energized with the alternating signal from d.c. to a.c. converter 10, its output shaft will rotate. This shaft is coupled via a transmission and speed control 12 to the mechanical load 13. A speed control lever 14 controls the speed at which mechanical load 13 rotates relative to the speed at which the shaft of a.c. motor 11 rotates in conjunction with transmission and speed control 12. The transmission and speed control 12 may be of a kind found in an ordinary automobile. Mechanical load 13 may be the driving wheels of a vehicular load or the shaft of a stationary mechanical device.

In the course of time, delivery of energy from primary power source 3 to mechanical load 13 will cause the energy of primary power source 3 to become depleted. The output of voltage sensing network 4 will drop. This will cause the output of signal multiplexer 5 to drop. This reduced signal into analog to digital converter 6 will cause the binary number produced at its output to assume a lower value. This lower value is sensed by control computer 1. When this number falls below a predetermined value indicating that primary power source 3 is depleted, a signal is transmitted to mode control networks 8 (one of the plurality of binary signals stored in control computer 1). A signal from mode control networks 8 will be transmitted to starting/stopping control 15. Starting/stopping control 15 will start up auxiliary power source 16. Auxiliary power source 16 may be a gasoline engine, a diesel powered engine, a propane powered engine, or other type. Starting/stopping control 15 will provide the appropriate starting sequence for the particular engine that forms auxiliary power source 16. A connection as gear train 17 couples the mechanical output of auxiliary power source 16 to electric generator 18. Electric generator 18 generates a d.c. voltage at its output. This output is connected to signal multiplexer 5 as well as to primary power source charging switch 19. This switch, as well as switch 9, may take the form of a contact switch such as may be found in a relay or may take the form of a solid state bipolar transistor or field effect transistor operating in the saturated mode. Once control computer 1 has sent a control signal to start auxiliary power source 16, it will periodically sense the voltage appearing at the output of electric generator 18. This is accomplished by causing signal multiplexer 5 to allow the output of electric generator 18 to pass to analog to digital converter 6. Analog to digital converter 6 generates a binary output equivalent to the output voltage of electric generator 18. This binary signal is transmitted to control computer 1. The magnitude of this signal will determine if electric generator 18 has reached sufficient speed to sustain the energy required by mechanical load 13. This is done by comparing the binary sequence from analog to digital converter 6 to one of the plurality of binary sequences stored in computer 1. This is necessary in order that the transition from primary power source 3 to auxiliary power source 16 is accomplished in a smooth manner without sudden changes in the speed of mechanical load 13.

When the output of electric generator 18 has reached the correct value, control computer 1 causes the propulsion system to convert from primary power source 3 operation to auxiliary power source 16 operation. This is accomplished in the following manner. Control computer 1 sends a signal to mode control networks 8 (one of the plurality of binary sequences stored in control computer 1). Mode control networks 8 in turn causes switches 9 and 19 to alter their positions. Switch 9 is first moved in such a way that d.c. to a.c. converter 10 which had previously connected to primary power source 3 is now connected to the output of electric generator 18. Next, switch 19 is moved so that the input of primary power source 3 is connected via charging resistor 20 to the output of electric generator 18. Electric generator 18 is now replenishing the depleted energy of primary power souce 3. The charging current which is the means by which the energy of primary power source 3 is replenished is limited by charging resistor 20. Charging resistor 20 prevents damage to primary power source 3. If primary power source 3 is not a chemical to electric energy converter (storage battery or batteries), then its energy might have to be replenished by other means. If this is the case, then switch 19 will be moved in such a way that the input to primary power source 3 will remain disconnected from the output of electric generator 18. Mechanical load 13 is being supplied with mechanical energy which is being generated by auxiliary power source 16. Primary power source 3 is being replenished with energy from auxiliary power source 16.

Control computer 1 sends a signal to signal multiplexer 5 which connects the output of current sensing network 7 to analog to digital converter 6. This produces a binary signal at its output which is connected to control computer 1. The binary signal produced by analog to digital converter 6 (which is proportional to the rate at which energy is replenished to primary power source 3) falls below a predetermined value (as determined by comparison to one of the plurality of binary sequences stored in control computer 1), control computer 1 will sense this condition. This indicates that primary power source 3 has been fully replenished and can again be used to supply energy to d.c. to a.c. converter 10 (and hence to a.c. motor 11 and mechanical load 13).

If primary power source 3 becomes completely replenished by auxiliary power source 16, control computer 1 will transfer the energy supply to mechanical load 13 from auxiliary power source 16 to primary power source 3. This is accomplished in the following manner. Control computer 1 sends a signal to mode control networks 8 (one of the plurality of binary sequences stored in control computer 1). Mode control networks 8 will in turn send signals to switches 9 and 19 to transfer the energy supply from the electric generator 18 to primary power source 3. D.c. to a.c. converter switch 9 is moved in such a way that the input to d.c. to a.c. converter 10 is connected to the output of primary source 3. Next, primary power source charging switch 19 is moved in such a way that the input of primary power source 3 (via charging resistor 20) which was previously connected to the output of electric generator 18 is no longer connected to any point in the system (open position). Electric generator 18 and auxiliary power source 16 are not needed again until it is sensed that primary power source 3 has been depleted. Electric generator 18 and auxiliary power source 16 may be removed from service. Control computer 1 sends a signal to mode control networks 8. Mode control networks 8 sends a signal to starting/stopping control 15. Starting/stopping control 15 interrupts or shuts off auxiliary power source 16.

Auxiliary power source 16 may be shut down before primary power source 3 has been replenished. This may occur if the vehicle (if mechanical load 13 is a vehicular load) reaches a predetermined destination before power source 3 has been replenished. To completely replenish primary power source 3, external power source 21 may be used. External power source 21 is a d.c. supply which may be produced by rectifying the signal from an ordinary a.c. potential that may be commercially produced. To accomplish replenishment of primary power source 3 from external power source 21, the user sends a signal from manual controls 2 to control computer 1. Control computer 1 in turn sends a signal to mode control networks 8. Mode control networks 8 sends signals to primary power source charging switch 19 and d.c. to a.c. converter switch 9. D.c. to a.c. converter switch 9 is moved to a position in which the input to d.c. to a.c. converter 10 is not connected to any point in the system. Primary power source charging switch 19 is moved so that the input to primary power source 3 (via charging resistor 20) is connected to external power source 21. Control computer 1 continues to monitor the replenishment of primary power source 3. This is accomplished in the following manner. A signal from control computer 1 causes the output of current sensing network 7 (whose output is proportional to the rate at which primary power source 3 is replenished) to appear at the output of signal multiplexer 5. This input to analog to digital converter 6 is converted into a binary representation (number) which is proportional to the rate at which primary power source 3 is being replenished. Control computer 1 senses this binary number. If this binary number falls below a predetermined value, then primary power source 3 has been completely replenished. Control computer 1 sends a signal (via mode control networks 8) to primary power source charging switch 19. Primary power source charging switch 19 is moved such so that the input to primary power source 3 (via charging resistor 20) is not connected to any element of the system.

Figure 2A:
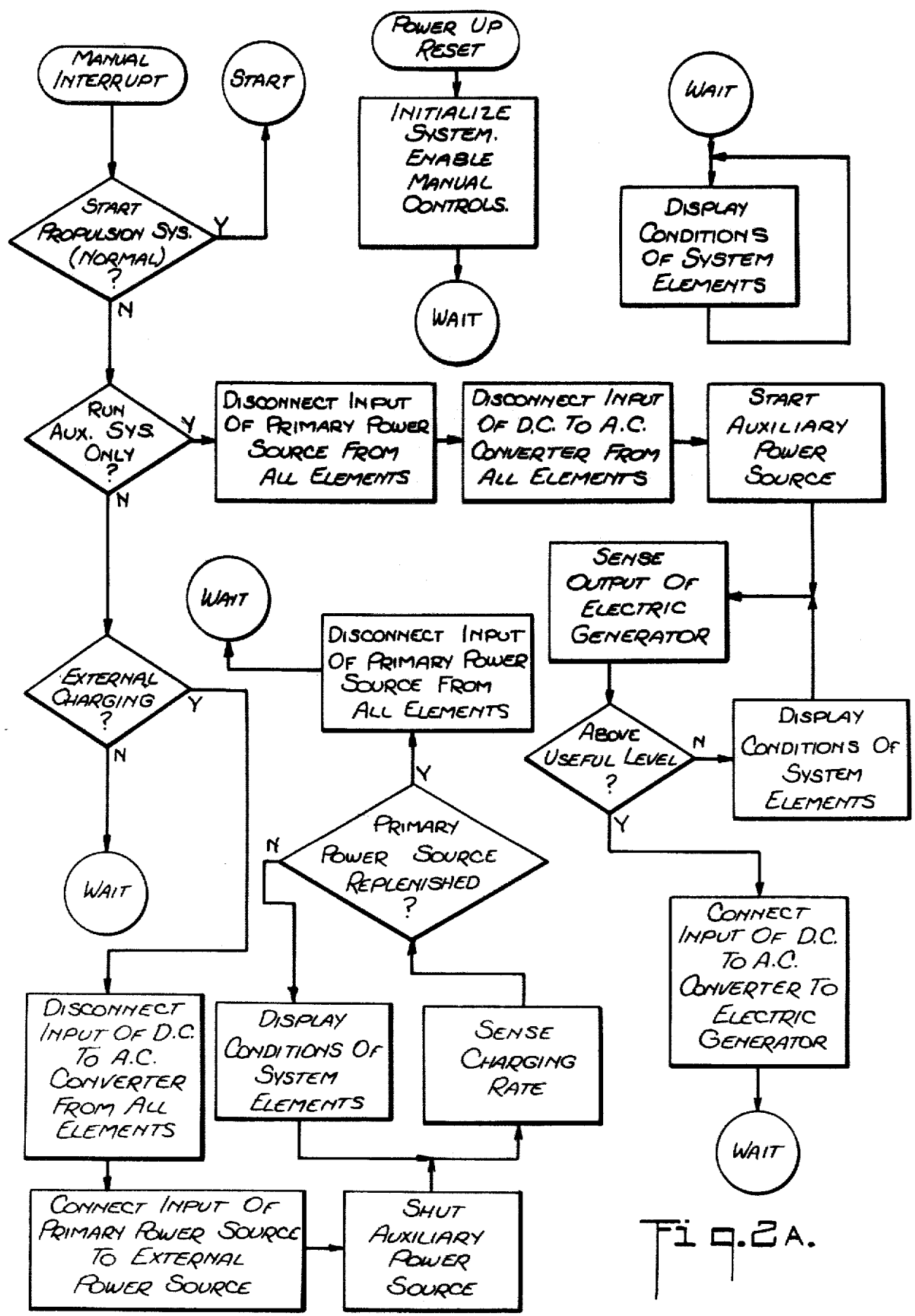
FIG. 2A is a sequence or flow diagram showing the sequence of steps that the control computer follows to respond to instructions from a user which are entered from the manual controls and which generate a manual interrupt.
Figure 2B:
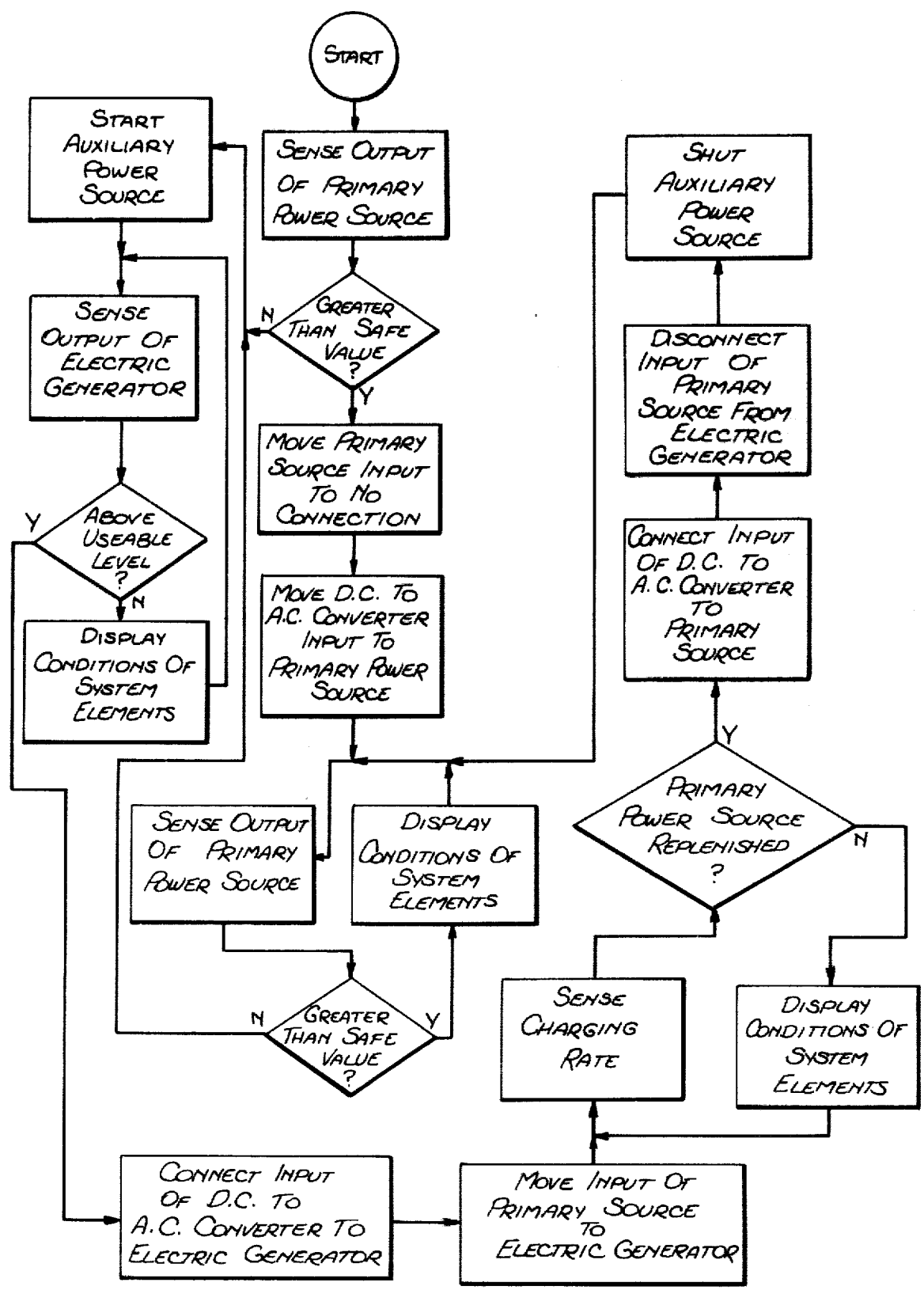
FIG. 2B is a continuation of the flow diagram of FIG.2A showing the sequence of steps that the control computer follows to sense the depletion of the primary power source and to start and stop the auxiliary power source.

FIGS. 2A and 2B

The sequence of operations of the system (the program steps carried out or executed by control computer 1) is noted in FIS. 2A and 2B. In the diagrams there shown, diamond shaped boxes with "?" marks represent decision points in the program. If the condition required by the decision is satisfied at the time it is encountered, then the next operation is the one encountered by following the arrow marked by a "Y". If the condition is not satisfied, the next instruction is that encountered by following the arrow marked "N". Rectangular symbols represent operations which are carried out by the control computer 1. Circular symbols represent continuation points in the program. That is, they represent the same point. If a circular symbol is encountered in a path, find another circular symbol with the same designation and continue at that point. An oval symbol represents a starting entry into the program either by virtue of initial application of power to control computer 1, or because of signals produced by manual controls 2. The sequence of operations follows the path defined by the arrows. Traversing the lines joining the various symbols by following directions designated by the arrowheads delineates the program.

When power is first applied to the system, control computer 1 begins operation at the oval marked "POWER UP RESET". The system is made ready to receive user commands from manual controls 2. While control computer 1 is awaiting signals from the user it displays the conditions of the systems elements, including such things as the voltage output of the primary power source 3 amongst other parameters. When the user sends a signal from manual controls 2 to control computer 1, an interrupt is generated and the program is transferred to the oval marked "MANUAL INTERRUPT". Three types of signals may be sent. A normal start may be requested. The system may be asked to run using the auxiliary power source 16. A command to charge the primary power source 3 from external power source 21 may be sent.

Figure 3:
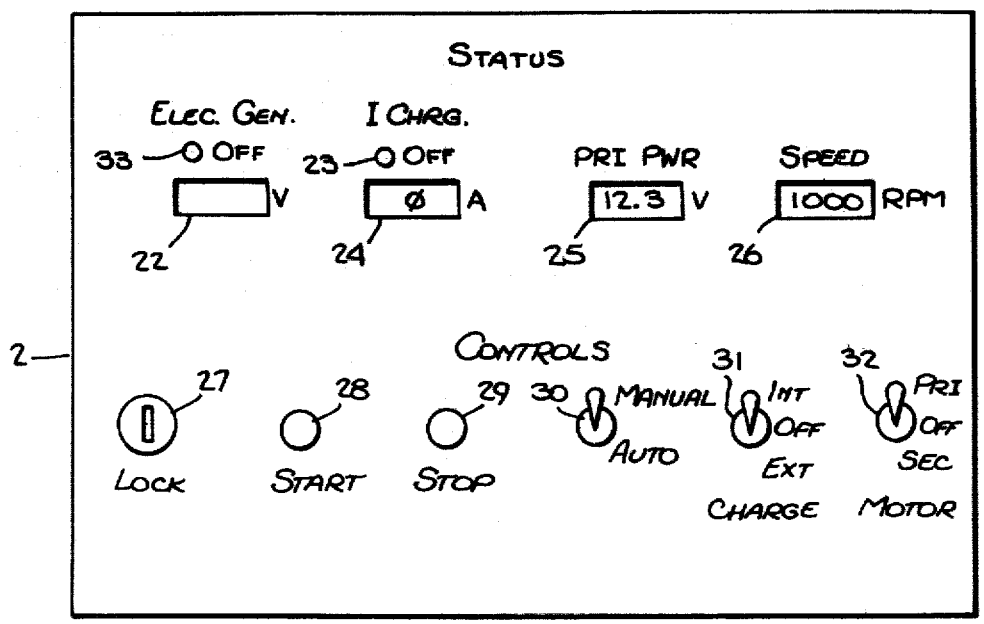
FIG. 3 is a schematic drawing showing the manual controls, including status indicators for the electric generator, charging current, primary power source, speed of the mechanical load, controls to start and stop either manually or automatically under the control of the control computer, charge selection switch, and motor control switch.

Normal propulsion system operation is shown in FIG. 2B. If the primary power source 3 has a safe output level, a.c. to d.c. converter 10 is connected to primary power source 3. The input of primary power source 3 is disconnected from all elements of the system. (The mechanical load 13 is now being driven by the propulsion system). The output of primary power source 3 is checked. As long as its output remains within safe limits, control computer 1 does not change the state of any of the elements. If control computer 1 senses that the value of the output of primary source 3 has fallen below its acceptable value, the auxiliary power source 16 is started. Control computer 1 does not change the elements (connections thereto) of the system until the output of electric generator 18 has reached a useable (or acceptable) level. Signals are then sent (when a useable level from electric generator 18 is achieved) which connect the input of d.c. to a.c. converter 10 to electric generator 18 (output thereof). Additionally (and sequentially), the input of primary power source 3 is connected to the output of electric generator 18. Control computer 1 now monitors (or senses) the charging rate at which energy is replenished to primary power source 3. This is accomplished in the manner previously described. As long as primary power source 3 has not been replenished, control computer 1 maintains the connections of all system elements. If control computer 1 senses that primary power source 1 has been replenished, changes in system element connections are initiated. The input of d.c. to a.c. converter 10 is now connected to primary power source 3. Subsequently, the input of primary power source 3 is disconnected from electric generator 18. As auxiliary power source 16 is not needed again until primary power source 3 has to be replenished, it (auxiliary power source 16) is shut down and ceases to operate along with electric generator 18 because of the arrangement previously described. Control computer 1 again monitors the output of primary power source 3 in the manner described above. The sequence just described (and delineated in FIG. 2B) continues until the user issues new instructions via manual controls 2. While the propulsion system is operating in the normal mode (herein described), the conditions of the system elements are displayed to the user as can be seen by the operations marked "DISPLAY CONDITIONS OF SYSTEM ELEMENTS" as shown in FIG. 2B. These conditions are displayed on indicators which are included in manual controls 2 and as seen in FIG. 3 hereinafter described.

When control computer 1 receives an interrupt from manual controls 2, it ceases (momentarily) the operation it is performing and control passes once again to the oval marked "MANUAL INTERRUPT" as shown on FIG. 2A. If the signal is to run the propulsion system using the auxiliary power source 16, control (sequence of control computer 1) follows the arrow marked "Y" on the decision diamond marked "RUN AUXILIARY SYSTEM ONLY".

In order to run the propulsion system using the auxiliary power source alone, the input of primary power source 3 is first disconnected from all elements of the system. Next, the input of d.c. to a.c. converter 10 is disconnected from all elements of the system. Auxiliary power source 16 is started. The output of electric generator 18 is sensed by control computer 1 in the manner previously described. When its output reaches a satisfactory level, the output of electric generator 18 is connected to the input of d.c. to a.c. converter 10. The system is now being driven from the auxiliary power source 10. Control computer 1 returns control (sequence) to the oval marked "WAIT". The control computer 1 will now monitor the conditions of all elements of the system and display these conditions to the user on manual controls 2. Control computer 1 will continue in this pattern until the user again signals new instructions. No elements of the system will be changed until another interrupt is received.

If the user desires to charge the primary power source 3 from an external source, a signal from manual controls 2 will initiate an appropriate control sequence. This sequence can be followed along the arrow marked "Y" from the decision diamond marked "EXTERNAL CHARGING" as shown on FIG. 2A. When this occurs, the input of d.c. to a.c. converter 10 is disconnected from all system elements. The input of primary power source 3 is connected (in the manner previously described) to an external power source 21. As the auxiliary power source 10 is not required for this mode of operation, auxiliary power source 16 is shut down. Control computer 1 now monitors the rate at which primary power source 3 is replenished with energy. When primary power source 3 has been replenished to an acceptable level, the input of primary power source 3 is disconnected from all elements of the system. Control computer 1 awaits new operational commands.

Figure 3

FIG. 3 is a schematic representation of manual controls 2. This element is divided into two areas. The first area consists of the status elements and indicators of the condition of the elements of the system. The second area consists of the controls which the user might employ to signal operational instructions to control computer 1. The electric generator light 33 will glow when the electric generator 18 is off. Electric generator indicator 22 displays the magnitude of the signal being produced by the electric generator 18. Charging current off light 23 will glow when the primary power source 3 is not being charged via electric generator 18 or external power source 21. Charging current indicator 24 displays the magnitude of signal produced by current sensing network 7 which is representative of the replenishment current flowing in charging resistor 20. Primary power indicator 25 displays the magnitude of the signal produced by voltage sensing network 4 which is representative of the voltage available from primary power source 3. Mechanical speed indicator 26 displays the speed at which mechanical load 13 is rotating in revolutions per minute (rpm). Propulsion system lock 27 energizes the entire system. Start pushbutton 28 will initiate operation of the propulsion system. Stop pushbutton 29 turns the propulsion system off. Mode selection switch 30 selects control of the propulsion system to be either governed by control computer 1 (when mode selection switch 30 is in the auto position) or by the operator (when mode selection switch 30 is in the manual position). Charge selection switch 31 allows the operator to put primary power source charging switch 19 into one of three positions. Primary source charging switch 19 will be positioned to operate from either electric generator 18, external power source 21, or no source corresponding to the position of INT., EXT., or OFF of charge selection switch 31. Motor selection switch 32 controls the position of d.c. to a.c. converter switch 9 (indirectly via control computer 1 and mode control networks 8). When motor selection switch 32 is in the PRI position, d.c. to a.c. converter switch 9 will be positioned so as to connect d.c. to a.c. converter 10 to primary power source 3. When motor selection switch 32 is in the SEC position, d.c. to a.c. converter switch 9 will be positioned so as to connect d.c. to a.c. converter 10 to electric generator 18. When motor selection switch 32 is moved to the OFF position, then d.c. to a.c. converter switch 9 will be positioned so as to disconnect d.c. to a.c. converter 10 from all elements of the system.

Figure 4

Figure 4:
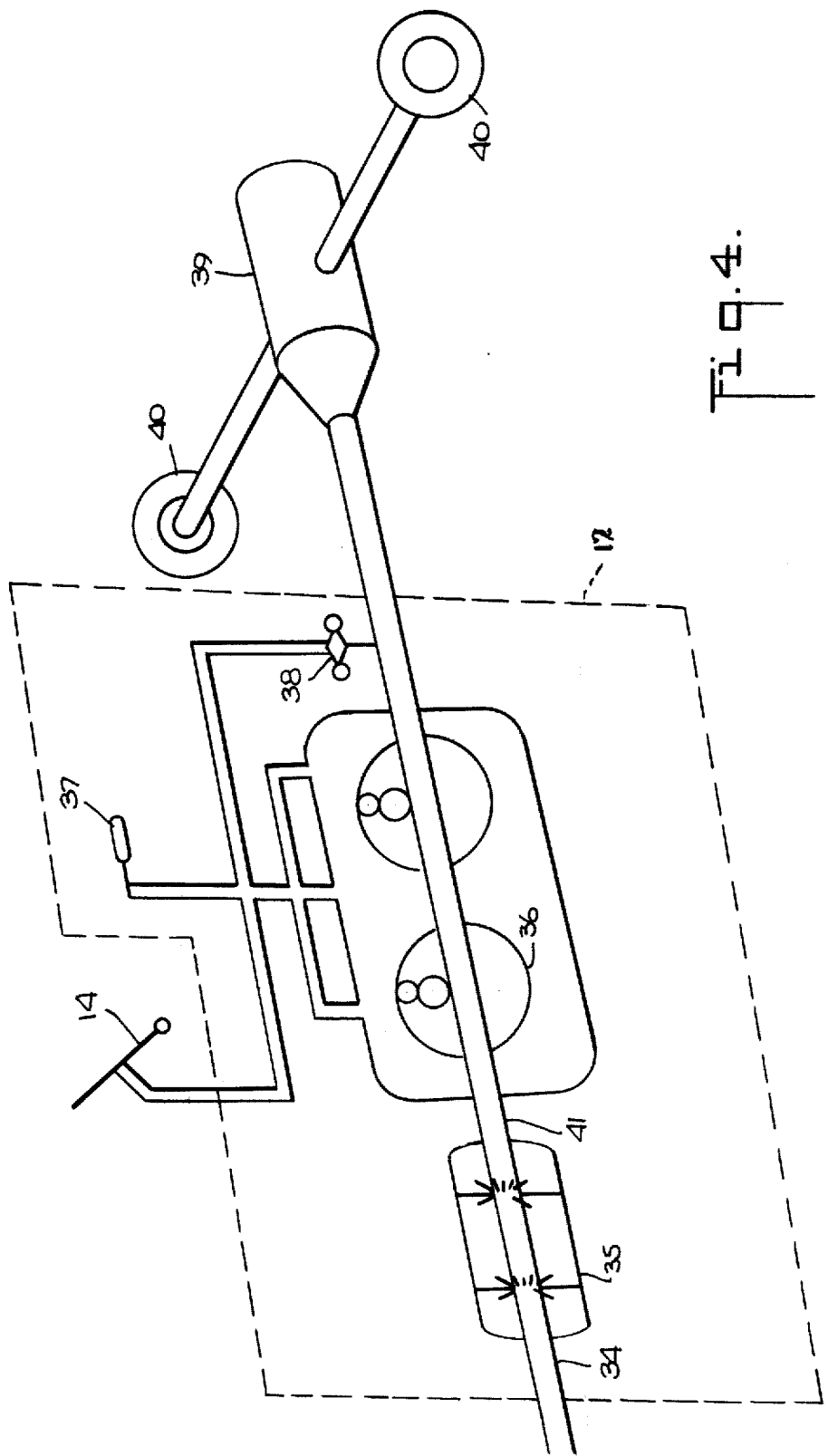
FIG. 4 is a schematic drawing of a typical transmission and drive assembly including fluid clutch, planetary gear system and housing, road speed gauge, differential gear and automobile tires when the hybrid propulsion drive of the invention is used to power a standard automobile.

FIG. 4 is a schematic drawing indicating the transmission and speed control arrangement when the system is used to drive a standard automobile or vehicular load. In this system the shaft of a.c. motor 11 which is shown as element 34 is the driving member of fluid clutch 35. The transmission shaft 41 of fluid clutch 35 couples the rotation to the planetary gear system and housing 36. The planetary gears of the planetary gear system and housing 36 shift automatically in response to position of gear selector lever 37, position of speed control lever 14 (the accelerator pedal of the vehicle), and road speed gauge 38. This will provide smooth transition of vehicle speed without requiring extraordinary power surges from the a.c. motor 11 and consequently from either primary power source 3 or auxiliary power source 16. The transmission shaft 41 is coupled to a standard differential gear 39 which is in turn connected to standard automobile wheels 40. The automobile wheels drive the vehicle.

LIMITS OF INVENTION

Market requirements under the invention and as relates to automobiles include various choices of gross car weight, top speed, and distance of travel for full battery charge. Accordingly, specifications of measurements and values of the systems and cooperating parts have not been fully set forth in view of ascertainability as by computation or other normal and known procedures. Examples of utilization of hybrid ddrive mechanisms may be found in representative prior art U.S. patents hereinbefore cited. Thus, Haumaier U.S. Pat. No. 3,994,354 discloses the hybrid drive mechanism under specifications and as applied to a 1965 Mustang body. And Yardney U.S. Pat. No. 3,650,345 discusses various types and nature of batteries.

Finally, we wish it understood that minor changes and variations of the invention including the system, components thereof, transitions and combinations together with the processes involved may all be resorted to without departing from the spirit of the invention and the scope of the appended claims.

We claim:
1. In hybrid propulsion apparatus having a prescribed sequence of operation and having an assembly of components operative for alternate use of a direct-energy conversion electrical source of energy and an electromechanical source of energy for electrical drive of stationary and vehicular loads, the improvement comprising:
 (a) signal multiplexer means including a plurality of connections to said assembly electric generator, to the assembly battery current and voltage sensing means, and further including control means such that either the signal from said electric generator or said current sensing or said voltage sensing means may appear at the output at any given time;
 (b) analog to digital converter means connected to said signal multiplexer means wherein a first sequence of binary signals is produced such that said first sequence of binary signals is equivalent to the signal produced by said signal multiplexer means;
 (c) control computer means connected to said analog to digital converter means and including a plurality of previously stored second sequence of binary signals for control of said prescribed sequence of operation;
 (d) mode control means connected to said control computer means to effectuate signal generation for the assembly starting and stopping and switching means, in accordance with signals generated by said control computer means.

2. In propulsion apparatus as set forth in claim 1 wherein said improvement includes manual control means connected to said control computer means whereby signals are transmitted to said computer control means in accordance with the desires and intentions of a human operator, and wherein said improvement includes at least one of the following sequences of said plurality of previously stored second sequence of binary signals:
 i. a third sequence of previously stored signals which activates said mode control means when said first sequence of binary signals as responsive of the signal from said voltage sensing means achieves a pattern equivalent to a fourth sequence of previously stored binary signals providing automatic starting of the assembly engine and automatic charging of the assembly battery;
 ii. a fifth sequence of previously stored binary signals which activates said mode control means when said first sequence of binary signals as responsive of the signal from said current sensing means achieves a pattern equivalent to a sixth sequence of previously stored binary signals, providing automatic stopping of charging of said battery;
 iii. a seventh sequence of previously stored binary signals which activates said mode control means when said first sequence of binary signals as responsive of the signal from said electric generator achieves a pattern equivalent to an eighth sequence of previously stored binary signals, providing automatic transfer of power from said battery to said electric generator.

3. In a process of electrical propulsion of a stationary and vehicular load and having a prescribed sequence of operation and utilizing a primary source of electrical and secondary source of mechanical energy, the improvement comprising the steps of: converting said electrical energy to a.c. current and energizing a motor thereby to propel said load; the step of sensing the power condition of said primary source of electrical energy for adequate propulsion of the motor; the step of introducing the secondary source of energy in the form of d.c. current for charging the primary source of electrical energy to the requirement thereof and at the same time disconnecting the primary source from the motor when the power condition of the primary source is sensed as inadequate and the simultaneous step of utilizing by the intervention of a converter a.c. current from a generator source energized by the initiation of operation of the secondary source and applying said a.c. current to the motor for powering the load until the power condition of the primary source becomes adequate as reflected by the said sensing means; and the step of reconnecting the primary power source to the motor and deactivating the secondary source of energy.

4. In the process of claim 3 wherein the said steps of introducing said second source of energy, disconnecting the primary source from the motor, the simultaneous step of utilizing by the intervention of a converter a.c. current from the generator, applying said a.c. current to the motor, reconnecting the primary power source to the motor and deactivating the generator are automatically controlled.

5. In the process of claim 4 wherein said automatic control step includes utilizing computer-controlled means.

6. In apparatus for the propulsion of vehicular or stationary mechanical loads having a prescribed sequence of operation, the improvement comprising:
  A. a primary power source including a direct energy conversion type;
  B. an auxiliary power source including a fuel combustion type;
  C. electric generator means to generate unidirectional or d.c. electrical energy and connected to said auxiliary power source;
  D. d.c. to a.c. converter means to effectuate single or multiple phase bidirectional electrical energy output;
  E. a.c. motor means connected to said d.c. to a.c. converter means including phase elements in correspondence with said single or multiple phase elements of said d.c. to a.c. converter;
  F. transmission and speed control means connected to the mechanical output shaft of said a.c. motor such that the mechanical output shaft of said transmission and speed control means may rotate at a different speed than the output shaft of said a.c. motor;
  G. external power source means to generate unidirectional or d.c. electrical energy;
  H. voltage sensing means connected to said primary power source to generate signals proportional to the output voltage of said primary source;
  I. current limiting means connected in series with the output of said primary power source;
  J. current sensing means connected to said current limiting means to generate signals proportional to the current flowing in said current limiting means;
  K. starting and stopping control means connected to said auxiliary power source to initiate and stop the operation of said auxiliary power source;
  L. switching means comprising a plurality of contacts connecting said current limiting means to either said electric generator or said external power source means or neither said electric generator or said external power source means and connecting said d.c. to a.c. converter to either said primary power source or said electric generator or neither said primary power source or electric generator;
  M. a signal multiplexer means including a plurality of connections to said electric generator and to said current sensing means and to said voltage sensing means and further including control means such that either the signal from said electric generator or said current sensing or said voltage sensing means may appear at the output at any given time;
  N. analog to digital converter means connected to said signal multiplexer means wherein a first sequence of binary signals is equivalent to the signal produced by said signal multiplexer means;
  O. control computer means connected in said analog to digital converter means and including a plurality of previously stored second sequence of binary signals for control of said prescribed sequence of operation;
  P. mode control means connected to said control computer means to effectuate signal generation for said starting and said stopping and said switching means, in accordance with signals generated by said control computer means; and
  Q. manual control means connected to said control computer means whereby signals are transmitted to said control computer means in accordance with the desires and intentions of a human operator.

7. In apparatus for the propulsion of vehicular or stationary mechanical loads having a prescribed sequence of operation, the improvement comprising:
  A. a primary power source including a direct energy conversion type;
  B. an auxiliary power source including a fuel combustion type;
  C. electric generator means to generate unidirectional or d.c. electrical energy and connected to said auxiliary power source;
  D. d.c. to a.c. converter means to effectuate single or multiple phase bidirectional electrical energy output;
  E. a.c. motor means connected to said d.c. to a.c. converter means including phase elements in correspondence with said signal or multiple phase elements of said d.c. to a.c. converter;
  F. transmission and speed control means connected to the mechanical output shaft of said a.c. motor such that the mechanical output shaft of said transmission and speed control means may rotate at a different speed than the output shaft of said a.c. motor;
  G. external power source means to generate unidirectional or d.c. electrical energy;
  H. voltage sensing means connected to said primary power source to generate signals proportional to the output voltage of said primary source;
  I. current limiting means connected in series with the output of said primary power source;
  J. current sensing means connected to said current limiting means to generate signals proportional to the current flowing in said current limiting means;
  K. starting and stopping control means connected to said auxiliary power source to initiate and stop the operation of said auxiliary power source;
  L. switching means comprising a plurality of contacts connecting said current limiting means to either said electric generator or said external power source means or neither said electric generator or said external power source means and connecting said d.c. to a.c. converter to either said primary power source or said electric generator or neither said primary power source or electric generator;

M. a signal multiplexer means including a plurality of connections to said electric generator and to said current sensing means and to said voltage sensing means and further including control means such that either the signal from said electric generator or said current sensing or said voltage sensing means may appear at the output at any given time;

N. analog to digital converter means connected to said signal multiplexer means wherein a first sequence of binary signals is equivalent to the signal produced by said signal multiplexer means;

O. control computer means connected to said analog to digital converter means and including a plurality of previously stored second sequence of binary signals for control of said prescribed sequence of operation;

P. mode control means connected to said control computer means to effectuate signal generation for said starting and said stopping and said switching means, in accordance with signals generated by said control computer means; and Q. manual control means connected to said control computer means whereby signals are transmitted to said control computer means in accordance with the desires and intentions of a human operator;

R. said plurality of previously stored second sequence of binary signals for control of said prescribed sequence of operation including at least one of the following sequences:

i. a third sequence of previously stored binary signals which activates said mode control means when said first sequence of binary signals as responsive of the signal from said voltage sensing means achieves a pattern equivalent to a fourth sequence of previously stored binary signals providing automatic starting of said auxiliary power source and automatic charging of said primary source;

ii. a fifth sequence of previously stored binary signals which activates said mode control means when said first sequence of binary signals as responsive of the signal from said current sensing means achieves a pattern equivalent to a sixth sequence of previously stored binary signals, providing automatic stopping of charging said primary power source means;

iii. a seventh sequence of previously stored binary signals which activates said mode control means when said first sequence of binary signals as responsive of the signal from said electric generator achieves a pattern equivalent to an eighth sequence of previously stored binary signals, providing automatic transfer of power from said primary source to said electric generator.

* * * * *